United States Patent
Patterson et al.

(10) Patent No.: US 7,410,045 B2
(45) Date of Patent: Aug. 12, 2008

(54) OFFSET OVERHEAD PLUNGER

(75) Inventors: Rafe T. Patterson, Fortson, GA (US); John W. Cash, III, Powder Springs, GA (US); Michael F. Flagg, Newnan, GA (US); John Hotchkiss, Duluth, GA (US); Patrick King, Smyrna, GA (US)

(73) Assignee: MeadWestvaco Packaging Systems, LLC, Glen Allen, VA (US)

( * ) Notice: Subject to any disclaimer, the term of this patent is extended or adjusted under 35 U.S.C. 154(b) by 0 days.

(21) Appl. No.: 11/682,620

(22) Filed: Mar. 6, 2007

(65) Prior Publication Data
US 2008/0000753 A1 Jan. 3, 2008

Related U.S. Application Data

(60) Provisional application No. 60/780,012, filed on Mar. 6, 2006.

(51) Int. Cl.
*B65G 47/10* (2006.01)
(52) U.S. Cl. .............. 198/370.07; 198/370.08
(58) Field of Classification Search ............ 198/370.02, 198/370.07, 370.08
See application file for complete search history.

(56) References Cited

U.S. PATENT DOCUMENTS

| | | | | |
|---|---|---|---|---|
| 3,471,012 A | * | 10/1969 | Calhoun | 198/370.08 |
| 3,771,648 A | * | 11/1973 | Revuelta | 198/370.08 |
| 3,791,518 A | * | 2/1974 | Vanderhoof | 198/370.08 |
| 4,320,840 A | * | 3/1982 | Braschos | 198/370.08 |
| 4,441,604 A | * | 4/1984 | Schlig et al. | 198/370.08 |
| 6,755,298 B1 | * | 6/2004 | Heuft et al. | 198/370.07 |

* cited by examiner

*Primary Examiner*—James R Bidwell
(74) *Attorney, Agent, or Firm*—Parks Knowlton LLC; Karen L. Ware

(57) ABSTRACT

A plunger assembly (30) is disposed on the access side of a conveyor (20). The conveyor (20) has a conveying surface upon which it transports articles by moving the conveying surface in a direction of flow (F). The plunger assembly (30) is mounted overhead vertically with respect to the conveying surface of the conveyor (20) such that sufficient clearance below the plunger assembly (30) is maintained to provide an access space through which the conveyor (20) and mechanisms and elements thereof can be accessed. Further, the plunger assembly (30) may be mounted both above and at least partially offset horizontally from the conveyor surface of the conveyor (20), such that no operative portion of the plunger assembly (30) breaks the plane (C) of the conveyor surface.

14 Claims, 4 Drawing Sheets

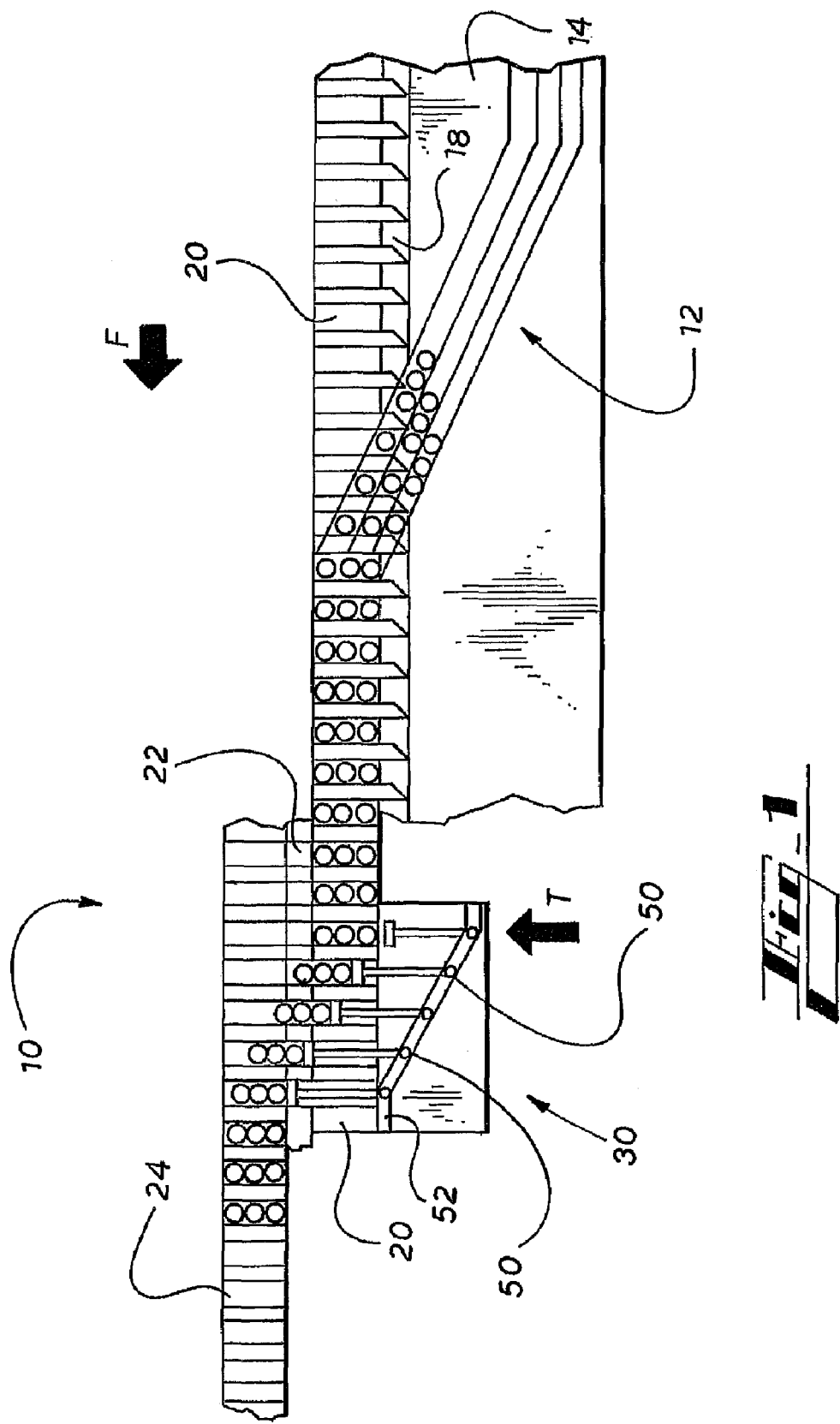
Fig_1

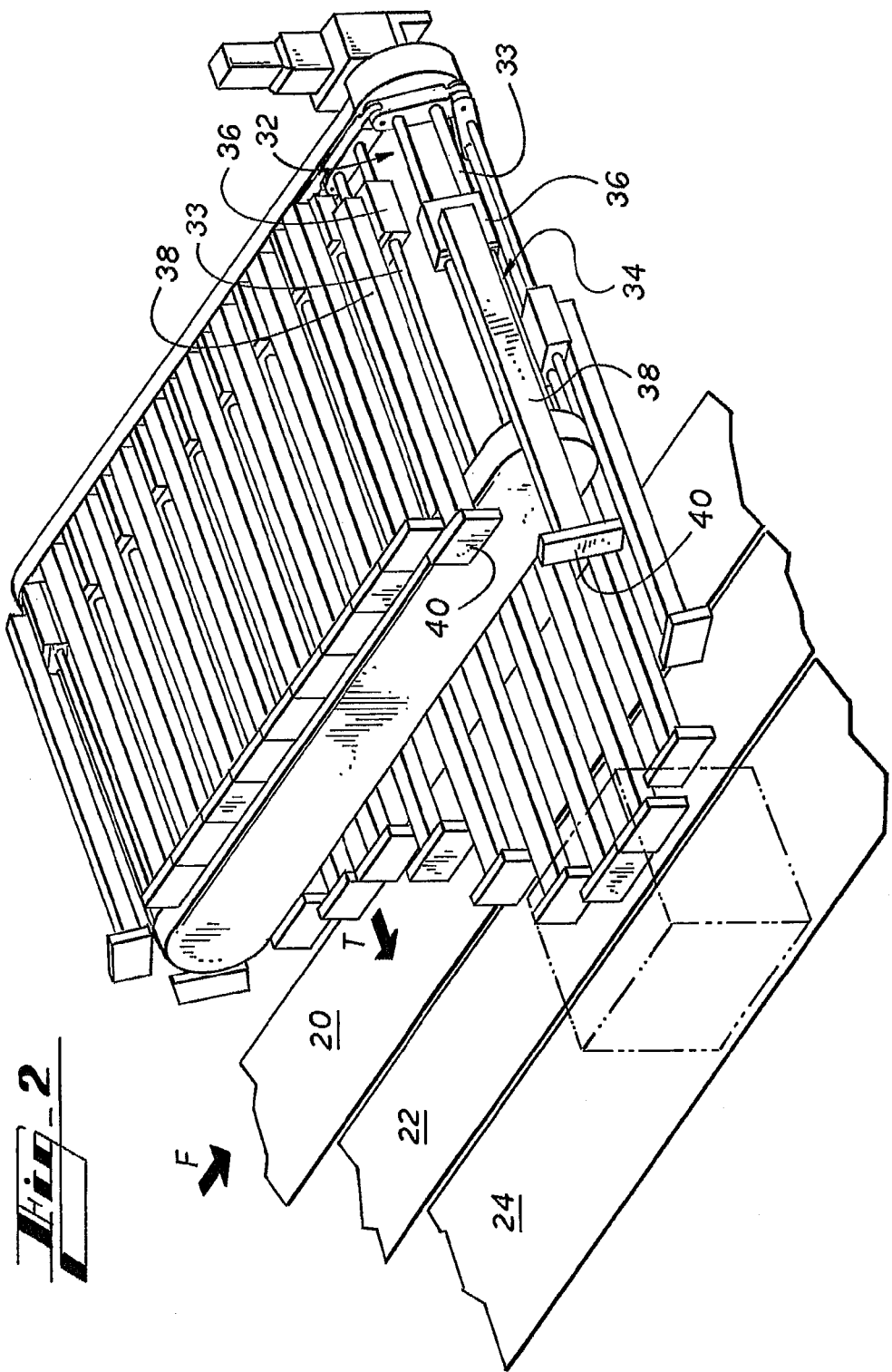

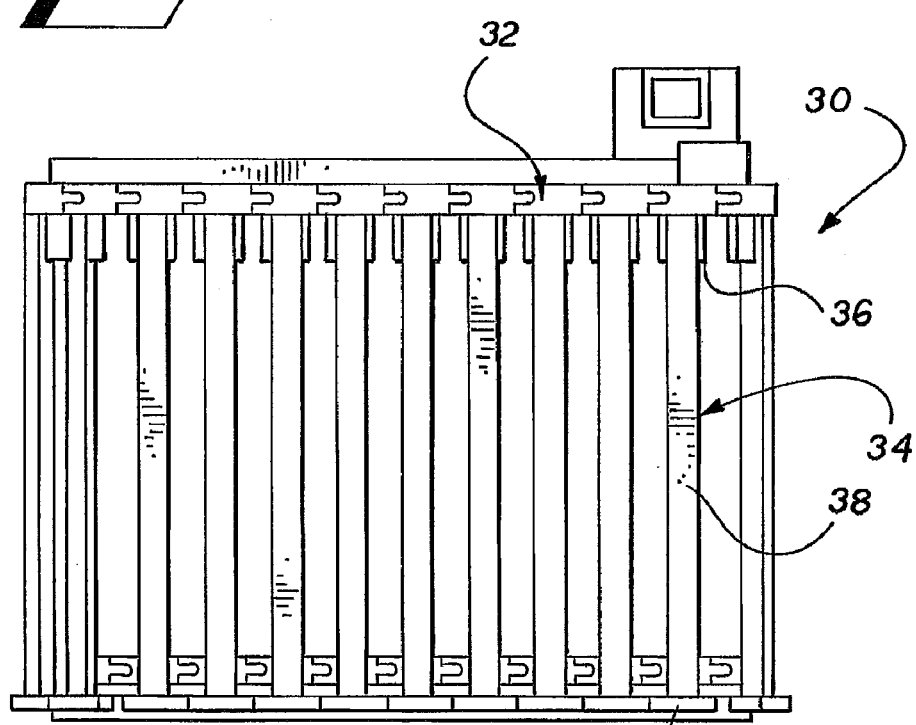
Fig_3
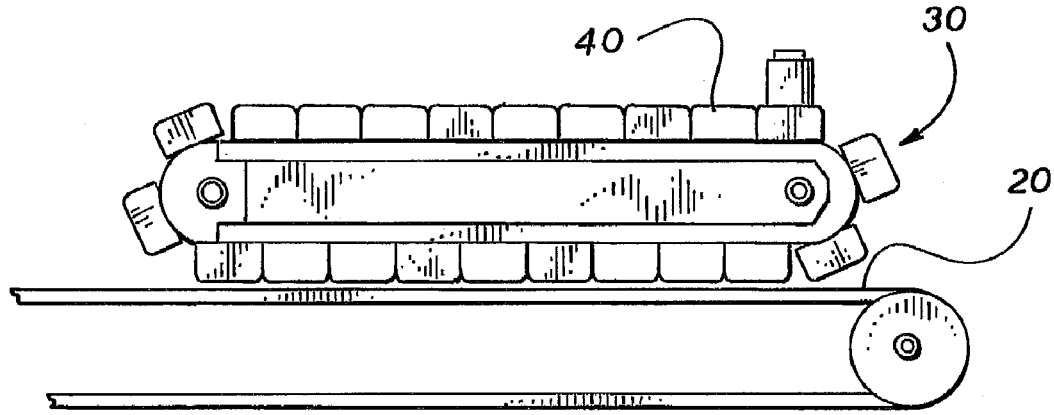
Fig_4

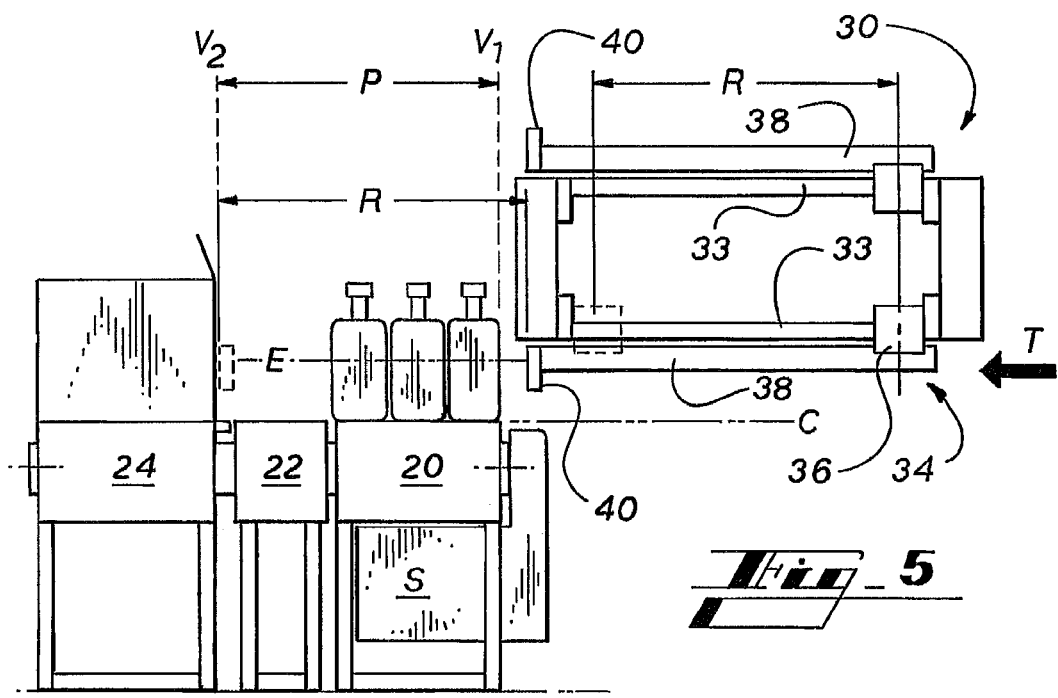
*Fig_5*
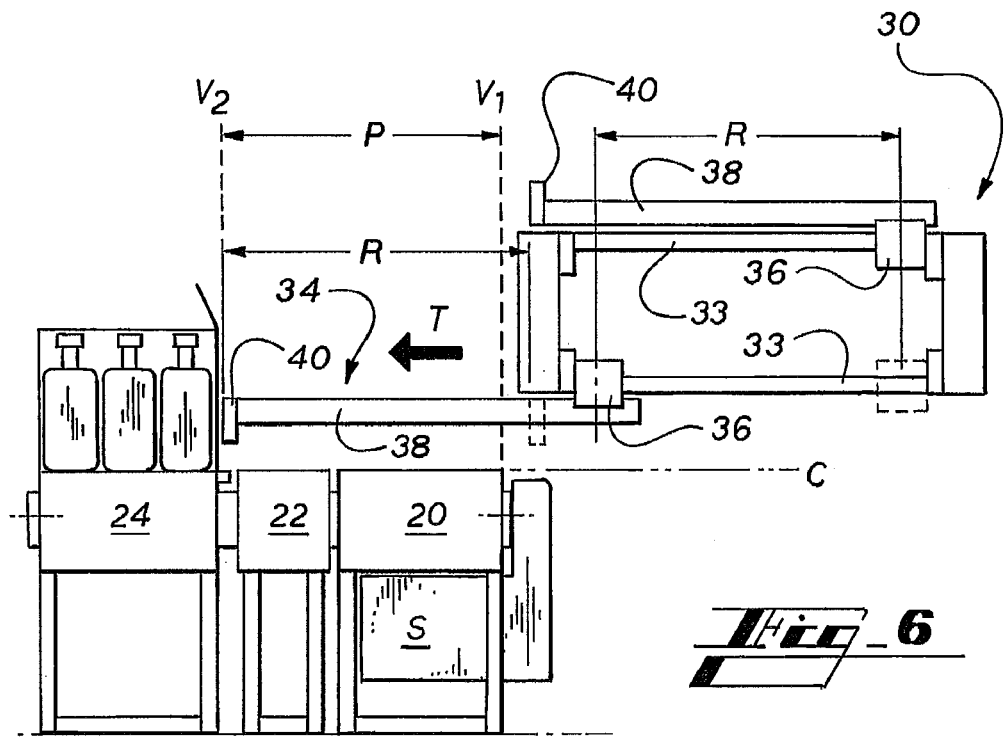
*Fig_6*

OFFSET OVERHEAD PLUNGER

CROSS-REFERENCE TO RELATED APPLICATIONS

This application claims priority to U.S. application Ser. No. 60/780,012, filed Mar. 6, 2006, the entirety of which is incorporated herein by reference.

TECHNICAL FIELD

This invention relates generally to a conveying system, and more specifically, to a plunger assembly for moving articles from a conveying surface in a conveying system.

BACKGROUND OF THE INVENTION

Packaging machines often use one or more conveyors as a part of a system for producing packages of one or more articles as output from the machine. Plunger mechanisms are useful in packaging machines for translating articles from one location to another. Such mechanisms are particularly useful in packaging machines having one or more conveyors.

A plunger assembly is a plunger mechanism that has been typically used in conjunction with a conveying system made up of one or more conveyors to move one or more articles from a first conveyor to another surface. Often, the second surface is a second conveyor. For example, in a packaging machine, an articulating plunger element of a plunger assembly may typically move articles such as cylindrical cans from a first conveyor (such as a so-called pocket conveyor where articles have-been grouped) over an intermediate surface (such as a so-called bridge conveyor) and ultimately into cartons that are traveling on a carton conveyor.

Previously in packaging machines, plunger assemblies and conveyors have been mounted from below the working surface of the conveyors. In such previous arrangements, the article-engaging portion of the plunger assembly has been vertically aligned with the surfaces of first and second conveyors. In addition, in such previous arrangements, the first conveyor is disposed horizontally between the second conveyor and the plunger assembly. The drive mechanisms and other operating elements of the conveyors in a packaging machine are typically located under the conveying surface or adjacent to the conveyor. In the side-by-side configuration of plunger assembly and conveyors described above, the drive mechanism and other operating elements of a plunger assembly are located below the article-engaging portion of the plunger assembly. Because of the side-by-side arrangement of the plunger assembly, the conveyors and their associated drive mechanisms and other operating elements, a problem exists in that the ability of a technician to obtain access to at least one conveyor (the first conveyor) and its associated elements is often limited. For example, and in particular, it is difficult for a technician to obtain access to the surface and other elements of the first conveyor because they are located between a plunger assembly and a second conveyor. In addition, the ability to obtain access to elements of one or more other conveyors and the plunger assembly is also often limited. Thus, maintenance, adjustment, and other technician operations that require access to the working surfaces and elements of the first conveyor in particular and, to a certain extent, one or more additional conveyors and the plunger assembly, are made difficult.

One solution that has been used to address the problem of obtaining access to assemblies, elements and mechanisms of the centrally-disposed first conveyor has entailed placing the driving motor of the first conveyor away from the first conveyor itself in order to improve accessibility to the motor. However, this solution has created additional difficulties in maintaining the alignment of the drive shaft that connects the driving motor to the drive mechanisms that remain under the first conveyor.

Another solution that has been attempted to address the problem of obtaining access to assemblies, elements and mechanisms of the centrally-disposed first conveyor has been to extend the length, or reach, of the first conveyor beyond the plunger assembly and to place the various elements which need to be accessed in the extended length, or reach. However, this solution creates additional costs and can be impacted by spatial constraints applicable to the conveying system.

Therefore, a heretofore unresolved need exists in the industry to address the aforementioned deficiencies and inadequacies of having a packaging machine that uses conveyors and a plunger assembly, but that permits access in particular to a centrally-located conveyor and its associated elements and more generally to various elements of one or more other conveyors and a plunger assembly.

SUMMARY OF THE INVENTION

The present invention overcomes the shortcomings of the prior art by providing a packaging machine having a conveying system that includes a plunger assembly that is advantageously mounted to provide an access space that facilitates access to a conveyor and its associated mechanisms and elements lying adjacent the plunger assembly, while also providing access to the elements of the plunger assembly. In particular, to achieve a mounting that provides the desired access space, in an exemplary embodiment the plunger assembly can be mounted vertically overhead and horizontally offset with respect to one or more adjacent conveyors and associated mechanisms.

Generally described, a plunger assembly is disposed on the access side of a conveyor, that is, the side of the conveyor from which a technician typically gains access to the conveyor to perform tasks. The conveyor has a conveying surface upon which it transports articles by moving the conveying surface in a direction of flow. In an exemplary embodiment, the plunger assembly is mounted overhead vertically with respect to the conveying surface such that sufficient clearance below the plunger assembly is maintained to provide an access space through which the conveyor can be accessed.

According to one aspect of the invention, the plunger assembly includes at least one plunger element, wherein each plunger element translates in an at least partially transverse direction to displace articles from the conveyor onto an adjacent receiving surface. At least a portion of the adjacent receiving surface is coincident with the conveyor plane through which the work surface of the conveyor travels. The receiving surface may be stationary, or may be a second conveyor that is likewise moving articles, either in the same or a different direction of flow. At least a portion of the conveyor and the receiving surface are adjacent and coplanar for the amount of time that it takes to displace articles from the conveyor to the receiving surface with a plunger element of the plunger assembly. In certain exemplary embodiments, the plunger elements revolve in a circuit, such that at some point along the circuit, at least one plunger element is in proximity with respect to the conveying surface so that when extended the plunger element displaces an article from the conveying surface onto the receiving surface. The plunger element moves through an engagement plane to displace the article.

The engagement plane may be disposed above and substantially parallel to the conveyor plane. For instance, when an article is a beverage bottle, the plunger element is disposed so as to engage the beverage bottle at an engagement point that lies somewhere around or below the shoulder of the bottle. Because of this arrangement, the plunger element translates along the engagement plane that is spaced apart from the conveyor plane by a distance equal to the height of the bottle at the engagement point. To provide the access space, the plunger assembly is positioned vertically at least partially above the conveyor plane.

In certain exemplary embodiments, the plunger assembly is mounted both above and at least partially offset horizontally from the conveying surface, such that no operative portion of the plunger assembly breaks the plane of the conveying surface. In these embodiments, the plunger elements translate while traveling along the lower portion of the circuit. Thus, the circuit traveled by the plunger elements lies entirely above the conveyor plane.

In other exemplary embodiments, the plunger assembly is mounted such that a portion of the circuit is below the plane of the conveying surface, but the plunger elements translate while traveling along the upper portion of the circuit (i.e., the portion which is above the conveyor plane). In these embodiments, the plunger assembly is mounted high enough to maintain the access space below.

The foregoing has broadly outlined some of the aspects and features of the present invention, which should be construed to be merely illustrative of various potential applications of the invention. Other systems, methods, features, and advantages of the present invention will be or will become apparent to one with skill in the art upon examination of the accompanying drawings and the following detailed description. Other beneficial results can be obtained by applying the disclosed information in a different manner or by combining various aspects of the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

BRIEF DESCRIPTION OF THE DRAWINGS

FIG. 1 is a partial plan view of an exemplary embodiment of a packaging machine conveying system including a plunger assembly, according to the present invention.

FIG. 2 is a perspective view showing an exemplary embodiment of a plunger assembly and portions of conveying surfaces of the packaging machine of FIG. 1.

FIG. 3 is a plan view of an exemplary embodiment of a plunger assembly of the packaging machine of FIGS. 1 and 2.

FIG. 4 is a side elevation view of an exemplary embodiment of a plunger assembly and a portion of a conveyor of the packaging machine of FIGS. 1-3.

FIG. 5 is a front elevation view of an exemplary embodiment of a plunger assembly of the packaging machine of FIGS. 1-4, with all plunger elements retracted.

FIG. 6 is a front elevation view of an exemplary embodiment of a plunger assembly of the packaging machine of FIGS. 1-4, with a plunger element extended.

DETAILED DESCRIPTION

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model, or pattern. The figures are not necessarily to scale and some features may be exaggerated or minimized to show details of particular components. In other instances, well-known components, systems, materials, or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Referring now to the drawings, wherein like numerals indicate like elements throughout the several views, the drawings illustrate certain of the various aspects of exemplary embodiments of a packaging machine that includes a plunger assembly. The plunger assembly is vertically positioned to provide access to an adjacent conveyor that transports articles as well as to provide visibility of the articles being transported.

Referring first to FIG. 1, therein is shown a plan view of an exemplary embodiment of a conveying system 10 according to the present invention. In the exemplary embodiment of FIG. 1, the conveying system 10 is an integral part of a packaging machine for erecting and loading cartons. However, the teachings of the invention can be applied in any apparatus involving conveying and transferring articles. Generally described, the conveying system 10 includes a plurality of substantially parallel conveyors that transport articles in a flow direction F. As the articles move through the conveying system 10 from conveyor to conveyor, they are grouped and packaged.

The articles are moved through the lanes of an infeed lane assembly 12 by an infeed conveyor 14. The articles are grouped within the lanes of the infeed lane assembly 12 by a grouping conveyor 18. The groups of articles then exit the infeed lane assembly 12 and are disposed in a desired configuration on a pocket conveyor 20. The grouped articles are then displaced by a plunger assembly 30 from the pocket conveyor 20, across a bridge conveyor 22, and into a carton (not shown) on a carton conveyor 24.

Referring momentarily now also to FIGS. 5 and 6, the drive system S of the pocket conveyor 20 may be disposed beneath or adjacent to the pocket conveyor 20. The drive system S, as described herein, includes any mechanical and electronic mechanisms as known in the art or yet to be invented that facilitate driving the conveyor. For example, the drive system S can include motors, gears, chains, and controls. To facilitate access to the drive system S, or otherwise facilitate access to the pocket conveyor 20, the plunger assembly 30 is positioned on a first, or access, side of the pocket conveyor 20 and elevated with respect to the pocket conveyor 20 and its drive assembly S (see FIGS. 1, 2, 4, 5 and 6). The plunger assembly 30 can be supported from above, for example, by a frame (not shown in the drawings). The position of the plunger assembly 30 is described in further detail below.

The bridge conveyor 22 and the carton conveyor 24 are positioned next to one another on a second side of the pocket conveyor 20. Referring now again particularly to FIGS. 5 and 6, a conveyor plane C is defined by the top, or conveying, surface of the pocket conveyor 20 upon which articles are transported in the flow direction F (flow direction F is illustrated in FIGS. 1 and 2).

Referring still particularly to FIGS. 5 and 6, a displacement P is determined according to, and defined as, the distance articles are to be moved by the plunger assembly 30 in the transverse direction T. For example, the displacement P can be defined by the distance between parallel vertical planes V1, V2, which extend along an edge of the conveying surface of the pocket conveyor 20 and an edge of the conveying surface of the carton conveyor 24, respectively. In the exemplary embodiment, the displacement P is the distance that is required to move articles from the pocket conveyor 20 into a carton on the carton conveyor 24.

Referring now to FIGS. 2 and 3, the plunger assembly 30 includes a series of interconnected carriage assemblies 32. Each carriage assembly 32 includes rails 33 to which a plunger element 34 is slidably attached. Each plunger element 34 is fixedly attached to a sliding portion 36 that slides along the rails 33. An extension portion 38 of the plunger element 34 is attached to the sliding portion 36 and a plunger head 40 of the plunger element 34 is attached at a distal end of the extension portion 38. In the exemplary embodiment, the length and extension of the plunger element 34 is at least as great as the displacement P. It is noted, however, that the length of the plunger element 34, as described below, is a design choice and does not have to be at least as great as the displacement P.

The plunger assembly 30 is positioned such that the plunger elements 34 extend in a transverse direction T toward the pocket conveyor 20. The transverse direction T is substantially perpendicular to the flow direction F. The plunger assembly 30 includes sprockets or wheels (not shown) that are driven to move the series of interconnected carriage assemblies 32 in a predetermined path, such as an elliptical, oval, or circular path, as best shown in FIG. 4. For example, as known in the art, sprockets can drive a roller chain that is attached to the carriage assemblies 32 to move the carriage assemblies 32 in a circuit. Referring now also momentarily to FIGS. 5 and 6, during travel of carriage assemblies along a portion of the circuit where the plunger element traverses outwardly of the plunger assembly, the plunger head 40 of each plunger element 34 is aligned with horizontal engagement plane E, which intersects articles on the pocket conveyor 20 at the optimal point along the length of the article for displacing them without toppling them. The engagement plane E is vertically above, and substantially parallel to, the conveyor plane C. Also, during this portion of the circuit, each carriage assembly 32 moves in the flow direction F at substantially the same velocity as articles on the pocket conveyor 20.

Referring now to FIGS. 5 and 6, each plunger element 34 can translate between the two ends of the rails 33 of a carriage assembly 32 for a rail distance R. In other words, the two ends of the rails 33 define the limits of travel for each plunger element 34. Specifically, a fully-retracted position is defined as that position in which movement of a plunger element 34 in a direction that is opposite the transverse direction T is limited by one end of the rails 33. A fully-extended position is defined as that position in which movement of a plunger element 34 in the transverse direction T is limited by the other end of the rails 33. Since each plunger element 34 is substantially rigid, the rail distance R defines the maximum range of movement of each plunger head 40 between a fully-retracted position and a fully-extended position.

Referring still particularly to FIGS. 5 and 6, the rail distance R is greater than or equal to the displacement P. The position of the plunger assembly 30 and the size and shape of the extension portion 38 are design choices that are dependent upon one another, as well as the rail distance R. These design choices are made such that the plunger head 40 will translate in the engagement plane E and such that the plunger head 40 is able to move in the translational direction T at least between the vertical planes V1, V2 that define the displacement P. In exemplary embodiments wherein the rail distance R is set to be greater than the displacement P, additional design choices for the parameters of the plunger assembly 30 and its elements, such as the horizontal placement of the plunger assembly 30 and the size and shape of the extension portion 38, are made possible within the teachings of the present invention.

In the exemplary embodiment, the extension portion 38 of the plunger element 34 is substantially straight and extends substantially horizontally in the transverse direction T from the lower surface of the sliding portion 36 toward the pocket conveyor 20. The extension portion 38 is horizontally aligned with the plunger head 40 and is thereby disposed in the engagement plane E for a portion of the circuit. By positioning the plunger assembly 30 and utilizing the illustrated arrangement of elements wherein the extension portion 38 of the plunger element 34 extends horizontally, in a straight line, directly from the sliding portion 36, the vertical distance between the plunger head 40 and the sliding portion 36 is minimized. This is advantageous because minimizing the vertical distance between a plunger head 40 and a sliding portion 36 reduces the moment, or rotational force, on the siding portion 36 that is produced when the plunger head 40 engages articles.

In the exemplary embodiment, the extension portion 38 is substantially the same length as the rail distance R. The plunger assembly 30 is positioned such that the engaging face of each plunger head 40 is substantially coplanar with the vertical plane V1 when each plunger element 34 is in a fully-retracted position. In the exemplary embodiment, the rail distance R is substantially the same as the displacement P such that the engaging face of each plunger head 40 is substantially coplanar with the vertical plane V2 when the plunger element 34 is in a fully-extended position.

Referring now momentarily back to FIG. 1, in the exemplary embodiment illustrated therein, each sliding portion 36 includes a cam follower 50 that is designed to move within a cam track 52. Referring now simultaneously to FIGS. 1, 2, 3, 5 and 6, as the interconnected carriage assemblies 32 move in the circuit, plunger elements 34 enter the engagement plane E and the cam follower 50 on each sliding portion 36 enters the cam track 52. As each plunger element 34 moves through the circuit in the flow direction F, each cam follower 50 moves in the cam track 52, whereby the curvature of the cam track 52 causes the plunger element 34 to translate relative to the carriage assembly 32 in the transverse direction T. Thereby, the translation of the plunger element 34 in the transverse direction T is controlled by the curvature of the cam track 52. It should be noted that the cam track 52 controls the velocity in the transverse direction T as well as the position of the plunger head 40 within the limits of the fully-extended and fully-retracted positions of the plunger head 40. Accordingly, the cam track 52 can be designed to reduce the travel range of the plunger head 40 allowed by a larger rail distance R such that the actual retracted and extended positions of the plunger head 40 correspond to the respective vertical planes V1, V2 that define the displacement P. Additionally, the retracted and extended positions of the plunger head 40 can be adapted to correspond to a different set of vertical planes by changing the cam track 52 rather than changing the position of the plunger assembly 30 or changing the extension portion 38.

In the exemplary embodiment, portions of plunger assemblies 34 that are in the engagement plane E define the lowermost part of the plunger assembly 30. In other words, no operative part of the plunger assembly 30 is disposed below the engagement plane E or the conveyor plane C. Thereby, an access area is provided below the plunger assembly 30 that facilitates access to the drive system S or otherwise to the pocket conveyor 20. In an additional exemplary embodiment, a portion of the plunger assembly 30 is disposed below the conveyor plane C, but the plunger assembly 30 is elevated from the floor level, or otherwise suspended or mounted from above, such that an access area is provided below the plunger assembly 30.

In another exemplary embodiment, the plunger assembly 30 is at least partially disposed directly above the pocket conveyor 20. Preferably, but not necessarily, the plunger assembly 30 is disposed such that articles traveling on the pocket conveyor 20 are visible. In this exemplary embodiment, the vertical position of the plunger assembly 30 above the conveyor plane C must be increased, relative to that of the previously-described offset exemplary embodiment, such that the plunger assembly 30 does not obstruct articles traveling on the pocket conveyor 20. The extension portion 38 of the plunger element 34 is then designed to accommodate the vertical distance between the sliding portion 36 and the plunger head 40 such that the plunger head 40 is disposed in the engagement plane E for a portion of the circuit. The shape and length of the extension portion 38 is designed based on the position of the plunger assembly 30 such that the engaging face of each plunger head 40 is substantially coplanar with the vertical plane V1 when the plunger element 34 is in a fully-retracted position. The range of the sliding portion 36 is substantially the same as the displacement P such that the engaging face of each plunger head 40 is substantially coplanar with the vertical plane V2 when the plunger element 34 is in a fully extended position.

The above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A packaging machine, comprising:
   a first conveyor for transporting articles, said first conveyor having a conveying surface that moves in a direction of flow, and said first conveying surface defining a conveyor plane;
   a receiving surface disposed on a first side of said first conveyor, at least a portion of said receiving surface being coincident with said conveyor plane; and
   a plunger assembly disposed on a second side of said first conveyor, said plunger assembly comprising at least one plunger element that travels along a closed path of a plunger circuit, wherein said at least one plunger element translates in an at least partially transverse direction while traveling along a lower portion of said plunger circuit to displace articles from said first conveyor onto said coincident portion of said receiving surface;
   wherein said plunger assembly is positioned above the conveyor plane to provide an access space that facilitates access to said first conveyor.

2. The packaging machine of claim 1, wherein said access space is provided underneath said plunger assembly.

3. The packaging machine of claim 1, wherein said plunger circuit is positioned substantially entirely above the conveyor plane.

4. The packaging machine of claim 3, wherein said at least one plunger element displaces said articles along an engagement plane, said engagement plane being above and substantially parallel to the conveyor plane.

5. The packaging machine of claim 1, wherein said receiving surface is defined by a second conveyor.

6. The packaging machine of claim 1, wherein said receiving surface moves in said direction of flow.

7. The packaging machine of claim 1, wherein said at least one plunger element displaces said articles along an engagement plane, said engagement plane being above and substantially parallel to the conveyor plane.

8. A packaging machine, comprising:
   a first conveyor for transporting articles, said first conveyor having a conveying surface that moves in a direction of flow, and said first conveying surface defining a conveyor plane;
   a receiving surface disposed on a first side of said first conveyor, at least a portion of said receiving surface being coincident with said conveyor plane; and
   a plunger assembly comprising at least one translatable plunger element that travels along a closed path of a plunger circuit, said plunger assembly disposed in relation to said first conveyor such that said at least one translatable plunger element translates in an at least partially transverse direction while traveling along a lower portion of said plunger circuit to displace articles from said first conveyor onto said coincident portion of said receiving surface;
   wherein said plunger assembly is positioned above the conveyor plane to provide an access space that facilitates access to said first conveyor; and
      so as to facilitate access to said at least one plunger element.

9. The packaging machine of claim 8, wherein said plunger circuit is positioned substantially entirely above the conveyor plane.

10. The packaging machine of claim 9, wherein said at least one plunger element displaces said articles along an engagement plane, said engagement plane being above and substantially parallel to the conveyor plane.

11. The packaging machine of claim 8, wherein said receiving surface is defined by a second conveyor.

12. The packaging machine of claim 8, wherein said receiving surface moves in said direction of flow.

13. The packaging machine of claim 8, wherein said at least one plunger element displaces said articles along an engagement plane, said engagement plane being above and substantially parallel to the conveyor plane.

14. A packaging machine, comprising:
   a conveyor for transporting articles, said conveyor having a conveying surface that moves in a direction of flow, and said conveying surface defining a conveyor plane; and
   a plunger assembly disposed on a first side of said first conveyor, said plunger assembly comprising at least one plunger element that travels along a closed path of a plunger circuit, wherein said at least one plunger element translates in an at least partially transverse direction while traveling along a lower portion of said plunger circuit to displace articles toward a second side of said first conveyor.

* * * * *